May 2, 1967  W. J. D. ESCHER  3,316,716
COMPOSITE POWERPLANT AND SHROUD THEREFOR
Filed July 1, 1964  3 Sheets-Sheet 1
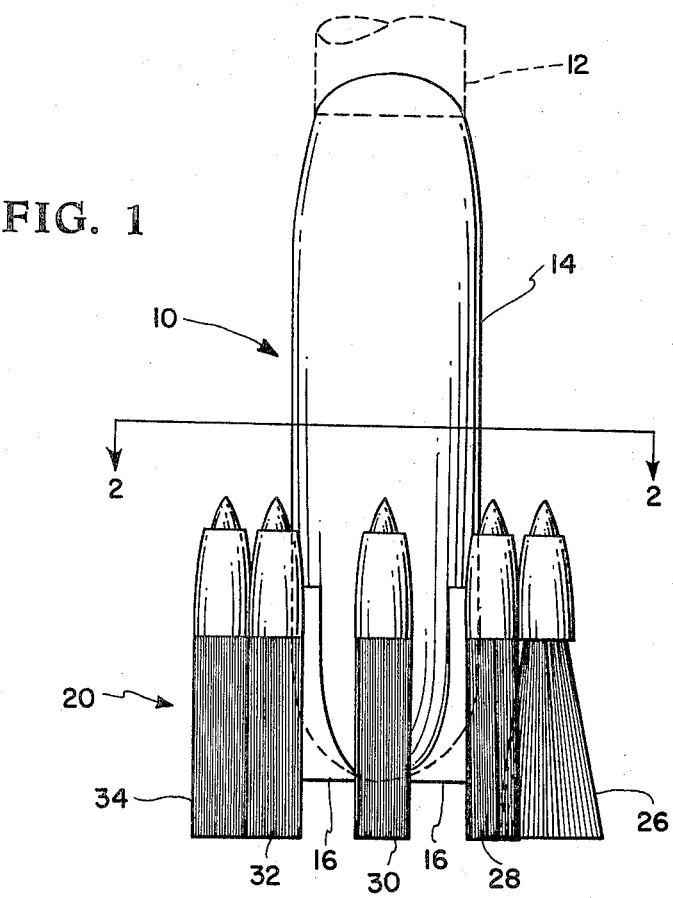
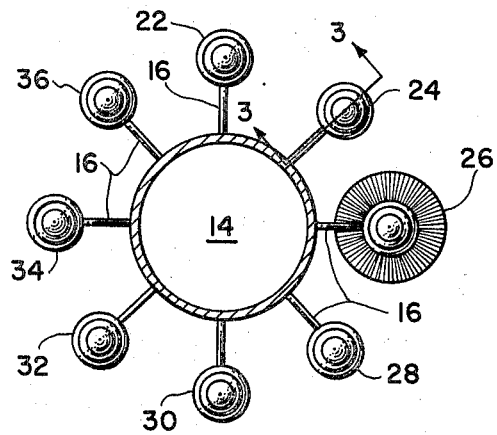
INVENTOR
WILLIAM J. D. ESCHER
BY
ATTORNEYS

INVENTOR
WILLIAM J. D. ESCHER

May 2, 1967   W. J. D. ESCHER   3,316,716
COMPOSITE POWERPLANT AND SHROUD THEREFOR
Filed July 1, 1964   3 Sheets-Sheet 3

INVENTOR
WILLIAM J. D. ESCHER

BY

ATTORNEYS

United States Patent Office 3,316,716
Patented May 2, 1967.

3,316,716
COMPOSITE POWERPLANT AND SHROUD THEREFOR
William J. D. Escher, Los Angeles, Calif., assignor to the United States of America as represented by the Administrator of the National Aeronautics and Space Administration
Filed July 1, 1964, Ser. No. 379,768
6 Claims. (Cl. 60—225)

The invention described herein may be manufactured and used by or for the Government of the United States of America for governmental purposes without the payment of any royalties thereon or therefor.

This invention relates generally to a propulsion system and more particularly to a powerplant having a fan engine and rocket motor combined. The instant invention further contemplates a novel thrust chamber shroud that functions when the fan engine and rocket motor are operating individually or concurrently.

Known propulsion systems and powerplants for vehicles traveling from the earth's atmosphere into outer space and returning therefrom have required a plurality of stages which were discarded after their one-time use and became undesirable space debris. Further, conventional rocket engine performance is very sensitive to the widely varying back pressure environments encountered during flight and air-using engines are unable to operate in outer space. In order to solve the back pressure problem, a compromise must be reached. The resulting compromise has been that rocket thrust chambers are conventionally designed for optimum performance at some given altitude. Performance above and below this design altitude falls off relative to that obtainable had the exhaust gas expansion been everywhere correct.

The present invention overcomes the difficulties inherent in the prior art by locating a rocket motor or motors aft of a mechanical compressor. Thus, while the vehicle is encountering substantial atmospheric pressure, the thrust of the fan engine complements that of the rocket motor and a ducted fan may provide air augmentation of the rocket jet stream. In the absence of back pressure, such for example as during flight in outer space, the rocket motor operates alone. A shroud functions as a portion of the conventional augmentor duct and also functions to provide a high expansion ratio nozzle for enhancing the performance of the rocket motor when the fan engine is not in operation. Accordingly, the instant invention provides a composite powerplant capable of efficient operation regardless of the environments through which it must travel.

It is an object of this invention to provide a composite powerplant for enhancing performance of a vehicle in environments of varying atmospheric conditions.

Another object of the instant invention is to provide a vehicle having a large storage capacity with a plurality of composite powerplants capable of performing efficiently in various types of environments.

A further object of this invention is to provide a composite powerplant wherein the thrust and exhaust stream of a fan engine augment performance of a rocket motor.

Still another object of the instant invention is to provide a thrust chamber shroud that may function either as part of a duct housing a fan engine and rocket motor or as a high expansion ratio nozzle for the rocket motor.

Yet another object of this invention is to provide a dual function thrust chamber shroud attached so a portion thereof adjacent the rocket motor may be expanded or contracted to permit efficient propulsion of a vehicle in varying environments.

A further object of the instant invention is to provide a shroud, one portion of which may be expanded or contracted, to function as a duct for a fan engine or as a high expansion ratio nozzle for a rocket motor and a reentry brake for a vehicle to which the shroud is applied.

Another object of the instant invention is to provide a method of propelling a vehicle in environments having diverse atmospheric conditions.

A still further object of this invention is to provide a method of propelling a vehicle which utilizes a composite powerplant wherein a fan engine and a rocket motor may be operated individually or concurrently.

Still another object of the instant invention is to provide a method of propelling a vehicle which includes concurrent operation of a fan engine and a rocket motor and positioning a thrust chamber shroud to effect efficient operation of either the engine or motor individually.

Generally, the foregoing and other objects are accomplished by locating a conventional fan engine, for example a turbofan, in the forward portion of a conventional duct housing. A rocket motor is located aft of the fan engine to permit the jet stream to augment the primary rocket exhaust stream. The after portion of the duct housing is pivotal from a configuration substantially parallel to the fixed portion of the duct housing to a position which forms an extension of the rocket motor thrust chamber nozzle where it is substantially the shape of the frustum of a cone. A rotatable ring shaft fits around the forward portion of the movable extension and is connected thereto by a linkage which causes expansion or contraction of the forward portion of the movable shroud. Thus, when the fan engine and rocket motor are operating concurrently, the movable shroud forms the after portion of the duct housing. However, when the air density of the environment becomes too low for efficient and economical operation of the fan engine, it is shut down and the shroud moved to the frustum configuration wherein it acts as a high expansion ratio nozzle for the rocket motor thrust chamber. Upon re-entry the movable shroud is repositioned to form the after portion of the duct and the fan engine restarted and efficient propulsion within the earth's atmosphere provided.

A more complete appreciation of the invention and many of the attendant advantages thereof will be readily apparent as the same becomes better understood by reference to the following detailed description when considered in connection with the accompanying drawings wherein:

FIG. 1 is an elevational schematic view of a vehicle employing the concept of the instant invention;

FIG. 2 is a cross-sectional schematic view taken along line 2—2 of FIG. 1;

Figure 3:
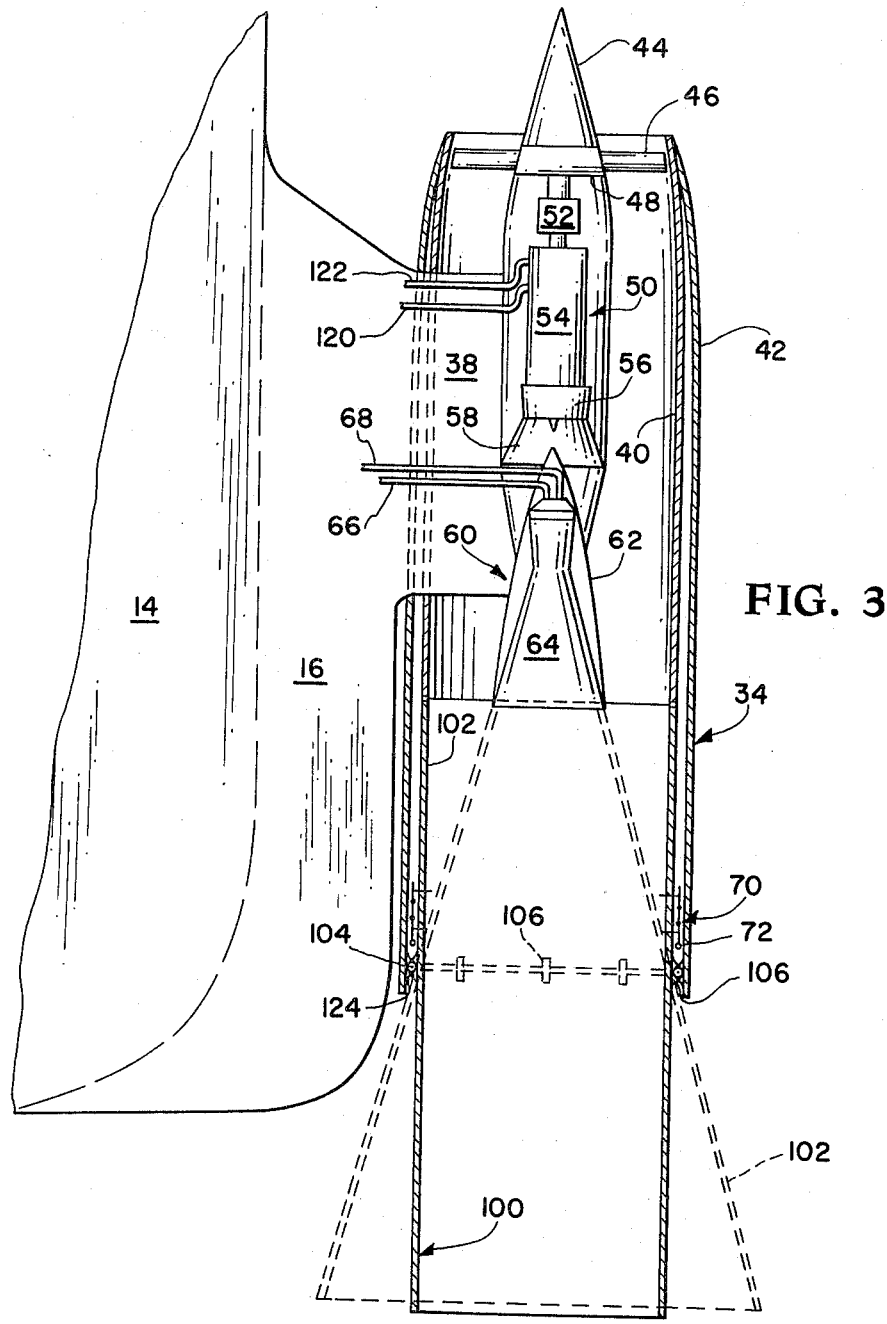
FIG. 3 is a cross-sectional diagrammatic view of the composite powerplant of the instant invention taken along line 3—3 of FIG. 2.

Referring now to the drawing wherein like reference numerals designate identical or corresponding parts throughout the several views and more particularly to FIG. 1 wherein a vehicle, generally designated by numeral 10, is shown as having payload container 12 and propellant tank or support assembly container 14. Aerodynamic outriggers or pod supports 16 extend from assembly structure 14 to support the propulsive units making up propulsive section 20. Outriggers or pylons 16 act not only as support means for the propulsive units, but also provide protection for fuel lines, wiring, and other elements necessary for remote operation of the propulsive units.

Vehicle 10 is shown, more clearly in FIG. 2, as having eight propulsive units in propulsive section 20. However, any number necessary for providing sufficient thrust may be used. These propulsive units are composite powerplants 22, 24, 26, 28, 30, 32, 34, and 36 which are secured to propellant tank assembly 14 by outriggers 16. FIGS. 1 and 2 show composite powerplants 34 and 26 adapted for alternative functions as will be more fully described hereinafter. Outriggers 16 have powerplant mounts 38 (FIG. 3) extending outwardly therefrom and which form supports for the elements of the composite powerplants.

Referring now to FIG. 3, a typical composite powerplant 34 according to the instant invention includes duct 40 having movable portion 100 both of which are protected by outer skin 42. The fixed section of duct 40 is of generally tubular configuration to act as a housing for fan engine 50 and rocket motor 60. Aerodynamic fairing 44 functions to protect fan engine 50 and as a deflector for incoming air which encounters ducted fan or propeller 46 mounted on fan mount 48. Fan engine or turbine unit 50 is of conventional construction and includes gear box 52, compressor and combustion chamber 54, turbine 56 and exit nozzle 58. Rocket fairing 62 acts as a protector and mount for rocket motor 60 and may support the latter from mount 38.

Rocket motor 60 is conventional and may be of either liquid or solid propellant type. As shown in FIG. 3 it is assumed that rocket 60 is of the liquid propellant type that requires propellant lines 66 and 68 which extend from rocket thrust chamber 64 to the interior of propellant tank assembly 14 and function as conduits for fuel going into thrust chamber 64. Similarly, conduits 120 and 122 function as fuel lines for turbine unit 50.

As shown in FIG. 3 movable section 100 has shroud or nozzle extension 102 hingedly or pivotally secured to outrigger 16 and skin 42 on pivot ring 104 which is attached by pivot ring supports 106 intermittently spaced about the periphery of shroud 102. Supports 124 are secured to outrigger 16 or skin 42 in a manner permitting pivot ring 104 to remain in a substantially fixed location. Thus, it is seen that supports 124 may be pivotally or fixedly secured to ring 104 which holds shroud 102 through ring supports 106 that are rigidly secured to shroud 102 but are capable of rotation about ring 104. Shroud or nozzle extension 102 is displaced by operating or activating mechanism 70, as will be described hereinafter.

Figure 6:
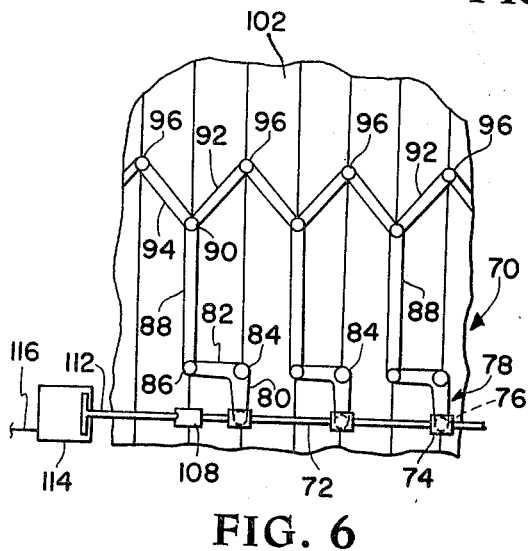
FIG. 6 is a detailed view of a portion of the shroud and operating mechanism therefor.
Figure 7:
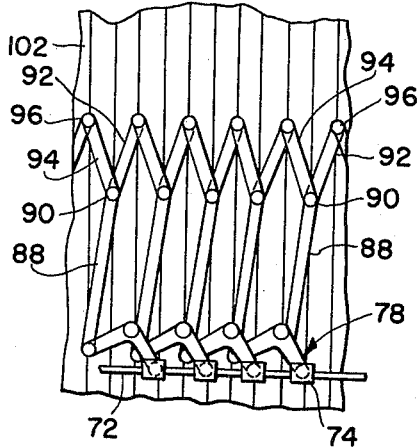
FIG. 7 is a detailed view of the portion of the shroud with the operating mechanism in an alternative position.

One embodiment of a mechanism for operating shroud 102 of the instant invention is shown in FIGS. 6 and 7. Shroud 102 is shown as made of thin corrugated high-temperature metal; however, any material having similar qualities and characteristics may be employed without departing from the concept of the instant invention. For example, some materials may be too thick or incapable of expanding and contracting when formed with corrugations. Consequently, it may be necessary to utilize several members connected along their longitudinal edges by pivots, such as by piano hinges. However, presently known high-temperature metals may be formed with corrugations such that the entire member is foldable along the crest and through lines.

Figure 4:
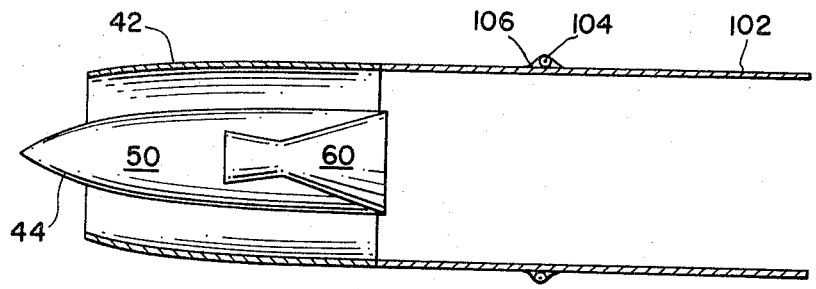
FIG. 4 is a diagrammatic sectional view showing the shroud of the instant invention in one position.

Shroud 102 is shown in FIGS. 4 and 6 substantially as it would appear when the forward portion thereof is expanded to form the after section of the engine duct when the composite powerplant is operating with the fan engine and rocket motor providing thrust concurrently. Operating mechanism 70 includes ring 72 which extends about the periphery of shroud 102. Sleeves 74 are rotatably attached to ring shaft 72 and have pivot points 76 for bellcranks 78. Bellcranks 78 include leg 80 and arm 82 which are pivotally attached to shroud 102 at 84.

Bar 88 is pivoted to arm 82 at 86 and to links 92 and 94 at 90. A pair of links 92 and 94 are pivotally attached to shroud 102 at 96. In order to provide ease of operation, pivot points 84 and 96 of operating mechanism 70 are located on the ridges of the corrugations in shroud 102. It is to be understood also that the connection between bar 88 and links 92 and 94 could be a universal joint rather than pivotal to eliminate the rotatable connection of sleeve 74 on shaft 72. Either type of connection would permit the slight angular displacement of the linkage that is required by expansion or contraction of the forward portion of shroud 102.

At any given point along ring shaft 72 a connection 108 is provided for piston rod 112. Connection 108 could be of the conventional ball and socket arrangement in order to permit multidirectional movement of piston rod 112 with respect to ring shaft 72. Piston rod 112 extends to cylinder 114 which would be controlled and activated by any conventional means, such for example as a hydraulic system (not shown) having fluid line 116.

Figure 5:
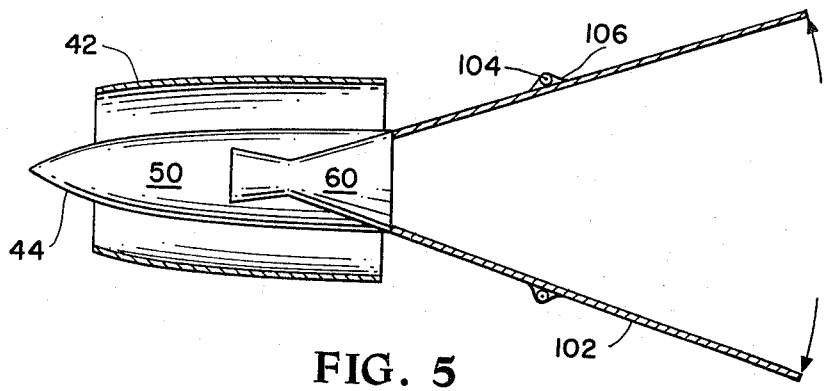
FIG. 5 is a diagrammatic sectional view of the instant invention with the shroud in an alternative position.

FIG. 7 shows a detail of shroud 102 when the forward portion thereof is contracted to form the frustum shaped exhaust nozzle as shown schematically in FIG. 5. It is readily apparent that as ring shaft 72 is moved to the right, as seen in FIGS. 6 and 7, bellcrank 78 which is pivoted at 76 to sleeve 74 will rotate about pivot 84. Rotation of bellcrank 78 causes pivot point 86 and bar 88 to be moved toward ring shaft 72. As rod 88 is displaced it causes links 92 and 94 to pivot about points 96 and tends to draw adjacent pivot points 96 together and thereby contract the forward portion while expanding the after portion of shroud 102. A reversal of the direction of movement of ring shaft 72 forces bars 88 away therefrom and thus pivot points 96 away from one another to cause the forward portion of shroud 102 to expand radially, and assume the configuration as shown in FIG. 4.

*Operation*

Once vehicle 10 has been put in position for takeoff, which may be either in a vertical position as shown in FIG. 1 or in the conventional horizontal position, the fuel is placed in propellant tank assembly 14 and payload 12 is placed in position. The propulsive units are then started by igniting fan engine 50 and rocket motor 60. At this point in the flight profile, shroud 102 is in the expanded position shows in FIG. 4 and forms a portion of duct 40. As the thrust provided by engine 50 and motor 60 increases, vehicle 10 takes off and may be flown in any desired flightpath. While air density is sufficient the exhaust from engine 50 and the atmospheric air flowing through duct 40 provide augmentation for rocket 60 to overcome the problem of back pressure regardless of the air density encoutered at any specific point in the flightpath. When atmospheric pressure and air density become insufficient to make operation of engine 50 economical, the engine is shut down and the control mechanism activated. This causes operating mechanism 70 to displace shroud 102 to form the high expansion ratio nozzle as shown in FIG. 5. Such a conical frustum shaped nozzle for thrust chamber 64 permits efficient operation of rocket motor 60 as it propels vehicle 10 in environments having a low air density. After accomplishment of the mission, for example in outer space, rocket motor 60 propels vehicle 10 back toward the earth's atmosphere with shroud 102 functioning as an air brake during re-entry. As air density increases the control mechanism is activated and operating mechanism 70 causes the forward portion of shroud 102 to be expanded. Subsequent activation of fan 46 and engine 50 permits efficient and economical propulsion of vehicle 10 to landing.

In view of the disclosure herein, it is readily apparent that the instant invention enhances the overall performance of a vehicle by augmenting the thrust of a propulsive unit at launch and during flight in the atmosphere by introducing a secondary mass-flow of atmospheric air into the rocket exhaust stream and by markedly increasing the nozzle expansion area during travel through environments having low air density.

Obviously many modifications and variations of the subject invention are possible in the light of the above teachings. It is, therefore, to be understood that within the scope of the appended claims the invention may be practiced otherwise than as specifically described.

What is claimed as new and desired to be secured by Letters Patent of the United States is:

1. In a vehicle propulsion system the combination comprising: a fan engine; a rocket motor located aft of said engine; and shroud means for forming an exhaust duct for said engine when a first position and a high expansion ratio nozzle for said motor when in a second position preventing operation of said engine whereby the vehicle may be propelled in environments of variable air density.

2. The system of claim 1 wherein said shroud is movably mounted aft of said motor; and means associated with said shroud for selectively moving the forward portion from a substantially cylindrical first position to a second frustum shaped position in which said shroud forms a high expansion ratio nozzle for said motor whereby when said shroud is in said first position the engine augments the motor and when said shroud is in said second position the motor provides the thrust for propelling the vehicle.

3. In a vehicle for traveling in environments of variable air density, a propulsion system comprising: a fan engine having a housing and an exhaust duct; said exhaust duct movable from a position substantially planar to said engine housing to a position wherein the after portion of said exhaust duct is expanded; and a rocket motor located within said engine housing aft of said engine whereby when said exhaust duct after portion is in said expanded position, the forward section thereof forms an extension of said rocket motor to provide a high expansion ratio nozzle therefor and the expanded duct further functions as an aerodynamic brake for the vehicle.

4. A composite powerplant comprising: a housing duct having an after section forming a movable shroud; a fan engine mounted within said duct; a rocket motor mounted in said duct aft of said engine; means for selectively operating said shroud from a first position substantially parallel to the forward section of said duct to a second position of frustum shape to provide a high expansion ratio nozzle for said motor; said means including a pair of links pivotally attached to said shroud; said pair of links also pivotally attached to a bar; said bar pivotally attached to a bellcrank which is pivotally attached to said shroud; said bellcrank pivotally secured to a sleeve mounted on a ring surrounding said shroud; and control means for rotating said ring, whereby movement of the ring causes contraction or expansion of one end of said shroud to permit the power plant to operate efficiently in environments having diverse gaseous densities.

5. The composite powerplant of claim 4 wherein the shroud is formed of foldable, high temperature resistant metal.

6. The method of propelling a vehicle in environments of various atmospheric conditions comprising: operating a fan engine and a rocket motor; shutting down the fan engine; positioning a movable shroud to provide a high expansion ratio nozzle for the rocket motor and to prevent operation of said fan engine; repositioning the shroud to form a duct permitting operation of the fan engine; and restarting the fan engine.

References Cited by the Examiner

UNITED STATES PATENTS

| | | | |
|---|---|---|---|
| 2,676,457 | 4/1954 | Kramer | 60—39.15 X |
| 2,929,203 | 3/1960 | Henning et al. | |
| 3,032,977 | 5/1962 | Neitzel | 60—39.33 X |
| 3,054,256 | 9/1962 | Minos | 239—265.17 |

FOREIGN PATENTS

| | | |
|---|---|---|
| 680,453 | 10/1952 | Great Britain. |
| 754,141 | 8/1956 | Great Britain. |

References Cited by the Applicant

UNITED STATES PATENTS

| | | |
|---|---|---|
| 2,481,330 | 9/1949 | Neal. |
| 2,900,789 | 8/1959 | Philpot. |
| 2,926,489 | 3/1960 | Halford et al. |
| 3,004,385 | 10/1961 | Spears et al. |
| 3,007,304 | 11/1961 | Wotton et al. |
| 3,102,385 | 9/1963 | Lyons. |
| 3,102,390 | 9/1963 | Barnet. |

MARK NEWMAN, *Primary Examiner.*

D. HART, *Assistant Examiner.*